(12) United States Patent
Kasai et al.

(10) Patent No.: US 7,541,037 B2
(45) Date of Patent: Jun. 2, 2009

(54) FILM COATING AGENT

(75) Inventors: Takahide Kasai, Takasaki (JP);
Takahiro Eguchi, Takasaki (JP)

(73) Assignee: Kirin Beer Kabushiki Kaisha, Tokyo (JP)

(*) Notice: Subject to any disclaimer, the term of this patent is extended or adjusted under 35 U.S.C. 154(b) by 397 days.

(21) Appl. No.: 10/468,796

(22) PCT Filed: Dec. 18, 2001

(86) PCT No.: PCT/JP01/11091

§ 371 (c)(1),
(2), (4) Date: Aug. 22, 2003

(87) PCT Pub. No.: WO02/072722

PCT Pub. Date: Sep. 19, 2002

(65) Prior Publication Data

US 2004/0071732 A1    Apr. 15, 2004

(30) Foreign Application Priority Data

Feb. 27, 2001    (JP) ............................. 2001-052096

(51) Int. Cl.
*A61K 36/06* (2006.01)
*B65D 85/10* (2006.01)

(52) U.S. Cl. .................................. 424/195.16; 426/106

(58) Field of Classification Search ............ 424/195.15, 424/195.16; 426/106
See application file for complete search history.

(56) References Cited

FOREIGN PATENT DOCUMENTS

| JP | 08-041218 A | 2/1996 |
| JP | 2000-044878 A | 2/2000 |
| JP | 2002-53807 A | 2/2002 |

OTHER PUBLICATIONS

English Translation of JP 08-041218, "Film with gas barrier property and a method for producing the same," Kureha Chem. Inc. Co., Ltd., pp. 1-35.

*Primary Examiner*—Jon Weber
*Assistant Examiner*—Kailash C Srivastava
(74) *Attorney, Agent, or Firm*—Foley & Lardner LLP

(57) ABSTRACT

The present invention provides a coating agent, wherein an oxygen-barrier property enhancer, which is one or more of glucose, mannose, maltose, trehalose, fructose, raffinose, arabinose, nigerooligosaccharide, lactose, D-glucono-1,5-lactone, arginine hydrochloride, ferrous sulfate, sodium dihydrogen phosphate, mannitol, Palatinit, and vitamin C, is added to acid-treated yeast cell wall fractions consisting of cell residue obtained by removing the internal soluble cell components of enzyme-treated yeast, the residue being treated with an acidic aqueous solution to further remove the solubilized components, and which enables a film being formed by coating with the coating agents for an oxygen permeability test by using the coating agent to attain at 23° C. and relative humidity of 60% an oxygen permeability coefficient of $<0.1\ cm^3\ mm/m^2 atm\ 24\ hr$.

11 Claims, No Drawings

FILM COATING AGENT

TECHNICAL FIELD

The present invention relates to a modification of the invention described in Japanese Laid-Open Patent Application No. 2000-44878, in other words, a coating agent wherein an oxygen-barrier property enhancer is added/blended into yeast cell wall fractions, more specifically, a coating agent which is applicable even in 100% water, which affords a finish that is not sticky despite its viscosity, thus resulting in coated particles and/or granules that do not stick to each other, a coating agent having a function to control dissolution time, coated materials comprising the use of such coating agents, a film formed from such a coating agent, which has an extremely low oxygen permeability coefficient even under highly humid conditions, packaging materials comprising the film, and packaged items packaged with the packaging materials.

BACKGROUND ART

Fine particles, microcapsules, granules, tablets, and the like, comprising useful coated substances in a variety of forms or with various properties, such as colorless or colored dyes, pharmaceutical products, agrochemicals, fragrances, flavors, and savories, feed materials, and food product materials, have conventionally been prepared for industrial purposes. Known examples of bases for coating fragrances, flavors, and savories, feed materials, food product materials, and the like, specifically, coating agents, include waxes and other oils, natural polysaccharides, proteins, shellac (natural resin secreted by the lac insect living in plants such as the legumes) and other resins, and the like. Chemically synthesized coating bases stipulated for pharmaceutical additives are also known in the case of pharmaceutical products. As for packaging films, chemical products such as nylon, PVDC, aluminum-deposited films, are mainly used, and with regard to natural products, only a slight amount of pullulan is produced.

Most of such conventionally known coating agents, however, suffer from the drawback of poor handling as a result of stickiness or poor dispersion during the preparation of the coating liquid. Additional problems with most pharmaceutical additives such as shellac, zein (corn protein), and ethyl cellulose, which are their bad effects on the environment and their high cost because of the use of solvents such as ethanol have been indicated. Although water dispersion types of ethylcellulose-based coating agents have become commercially available recently, these also suffer from problems in terms of handling, such as the changes in solution properties depending on temperature conditions during storage, and the inability to release them in wastewater into rivers because they contain various solvents. Still another problem is the poor dissolution in intestines and the extremely slow dissolution speed of the aforementioned zein which can be used in the field of food products.

In addition, based on the recent environmental issues, manufacturers substitute aluminum-deposited films, etc. for PVDC, which is excellent in both oxygen- and vapor-barrier properties, for fear of emission of dioxin. However, there arises a move for further cost reduction, improving the usefulness, images and environment-consciousness. As part of the move, manufacturers are cornered into a situation wherein they must advance the applied researches of biodegradable plastics and edible films.

Attempts have meanwhile been made to develop film materials from yeast. Japanese Patent Publication No. 56-19971, for example, discloses an edible protein film based on water-soluble proteins produced by removing the yeast cell membrane components from residual yeast which was produced by extracting nucleic acid. Japanese Laid-Open Patent Application No. 53-45385 discloses a method for producing a film, wherein the cells of a microorganism such as yeast are heated and alkali treated, acid is added for treatment involving isoelectric precipitation, the pH of the resulting precipitate is adjusted to between 6 and 8, and a plasticizer is added to the resulting gel-forming microorganism cells to produce a constituent.

Further, Japanese Laid-Open Patent Application No. 2000-44878 describes: a coating agent whose primary component comprises yeast cell wall fractions consisting of cell residue obtained by removing the internal soluble cell components of enzyme-treated yeast; a coating agent whose primary component comprises acid-treated yeast cell wall fractions consisting of cell residue obtained by removing the internal soluble cell components of enzyme-treated yeast, the aforementioned residue being treated with an acidic aqueous solution to further remove solubilized components; the aforementioned coating agents which comprise a plasticizer. These are thought to be coating agents with an extremely low oxygen permeability coefficient, which remedy the drawbacks of the conventional edible coating agents mentioned above, for example, by having a finish that is not as sticky, despite its viscosity, as gums such as gum arabic, resins such as shellac, and zein or Eudragit, and which results in coated particles and/or granules that do not stick to each other, as well as to be an excellent coating agent which can be used as an enteric coating agent capable of controlling the time at which dissolution begins.

As aforementioned, the completeness of the coating agent described in Japanese Laid-Open Patent Application No. 2000-44878 is extremely high, however, it has been found that in case where a film is manufactured with the use of the above-described coating agent whose primary component comprises yeast cell wall fractions, or a coating agent wherein glycerin as a plasticizer is added to the yeast cell wall fractions, the film fully displays its oxygen-barrier property under low humidity of RH 0%, while the value increases about 60-fold under high humidity of RH 60%. The object of the present invention is to provide a coating agent which is applicable even in 100% water, which affords a finish that is not sticky despite its viscosity, thus resulting in coated particles and/or granules that do not stick to each other, a coating agent having a function to control dissolution time, coated materials comprising the use of such coating agents, a film formed from such a coating agent, which has an extremely low oxygen permeability coefficient even under highly humid conditions, packaging materials comprising the film, and packaged items packaged with the packaging materials.

DISCLOSURE OF THE INVENTION

In the process of developing various applied products with the use of coating agents having excellent properties described in Japanese Laid-Open Patent Application No. 2000-44878, the present inventors have conducted a study for practical application of a film, which were made from the coating agents, as a packaging film and found that the oxygen-barrier property of such packaging film decreased quickly under high humidity (RH 60%). High level of oxygen-barrier property is required not only under low humidity but also under high humidity for a packaging film to function as a practical and versatile packaging material. Therefore, the present inventors had to review the preparation condition for yeast cell wall fractions, the method for producing a film, various added/blended components, etc. Among them, in the process of reviewing various added/blended components, a number of added/blended components were considered as a candidate substance for an oxygen-barrier property enhancer, and it has been found that a film formed from a coating agent wherein a specific oxygen-barrier property enhancer had been added to yeast cell wall fractions can attain oxygen permeability coefficient ($cm^3 \cdot mm/m^2 \cdot atm \cdot 24$ hr) less than 0.1 even under high humidity (RH 60%, 23° C.), and functions as a practical and versatile packaging material. Thus, the present invention has been completed.

The present invention relates to a coating agent wherein an oxygen-barrier property enhancer is added to yeast cell wall fractions consisting of cell residue obtained by removing the internal soluble cell components of enzyme-treated yeast, and which enables a film for an oxygen permeability test being formed by using the coating agent to attain an oxygen permeability coefficient ($cm^3 \cdot mm/m^2 \cdot atm \cdot 24$ hr) less than 0.1 under the condition of relative humidity 60%, 23° C. (claim 1), a coating agent wherein an oxygen-barrier property enhancer is added to acid-treated yeast cell wall fractions consisting of cell residue obtained by removing the internal soluble cell components of enzyme-treated yeast, said residue being treated with an acidic aqueous solution to further remove the solubilized components, and which enables a film for an oxygen permeability test being formed by using the coating agent to attain an oxygen permeability coefficient ($cm^3 \cdot mm/m^2 \cdot atm \cdot 24$ hr) less than 0.1 under the condition of relative humidity 60%, 23° C. (claim 2), the coating agent according to claim 1 or 2, wherein the oxygen-barrier property enhancer comprises an edible substance (claim 3), the coating agent according to claim 3, wherein the edible oxygen-barrier property enhancer is one or more kinds of compound selected from the group consisting of monosaccharides, oligosaccharides, low-hygroscopic amino acids, inorganic salts which form multihydrates, and low-hygroscopic sugar alcohols (claim 4), and the coating agent according to claim 4, wherein one or more kinds of compound selected from the group consisting of glucose, mannose, maltose, trehalose, fructose, arabinose, nigerooligosaccharide, lactose, D-glucono-1,5-lactone, arginine hydrochloride, ferrous sulfate, sodium dihydrogen phosphate, Palatinit, and vitamin C is used as the edible oxygen-barrier property enhancer (claim 5).

The present invention also relates to a coated material, on which a coating treatment has been conducted using the coating agent according to any of claims 1 to 5 (claim 6), the coated material according to claim 6, wherein the coated material is a granular material such as fine particles, granules, or tablets (claim 7), the coated material according to claim 6 or 7, wherein the coated material is food products, food product materials, pharmaceutical preparations, enzymes, microorganisms, seeds, agrochemicals, fertilizers, fragrances, flavors, and savories, or pigments (claim 8), a film formed from the coating agent according to any of claims 1 to 5 (claim 9), a packaging material comprising the film according to claim 9 (claim 10), and a packaged item comprising food products, food product materials, pharmaceutical preparations, enzymes, microorganisms, seeds, agrochemicals, fertilizers, fragrances, flavors, and savories, or pigments being packaged with the packaging material according to claim 10 (claim 11).

BEST MODE OF CARRYING OUT THE INVENTION (Starting Material Yeast)

Any yeast taxonomically belonging to yeasts may be used as the yeast serving as the starting material for the coating agent of the present invention. Examples include brewer's yeast, wine yeast, baker's yeast and torula yeast. More specific examples include *Saccharomyces cerevisiae, Saccharomyces rouxii, Saccharomyces carlsbergensis, Candida utilis, Candida tropicalis, Candida lipolytica,* and *Candida flayeri*.

Such yeasts can be used alone or in combination. The use of live yeast is preferred, although yeasts in configurations other than live yeast such as dried yeast can also be used, and can, for example, be treated in the same manner as live yeast by being suspended in water or the like. The size or configuration of the yeast that is used is not particularly limited, although the configuration is preferably as close as possible to spherical, and the size preferably ranges from between 1 and 20 μm.

(Yeast Cell Wall Fractions)

Yeasts contain water- or polar solvent-soluble internal cell components such as proteins, amino acids, saccharides, nucleic acids, and organic acids. Such internal cell components are readily solubilized in water, and when used as a coating agent without the removal of such soluble internal cell components, not only is the effect of delaying the time at which for dissolution begins inhibited, but the coating ability is also compromised. It is thus necessary to use yeast cell wall fractions obtained by removing the soluble internal cell components from yeast in order to obtain a coating agent with an effective time delay before dissolution begins.

To obtain yeast cell wall fractions by removing such soluble internal cell components from the yeast, it is necessary to solubilize such internal cell components by enzyme treatment to remove them from the cells. Any enzyme treatment used during the production of yeast internal cell components in the form of yeast extract can be used as the enzyme treatment, such as so-called autolysis featuring the use of the enzymes inside yeast cells; methods for adding enzymes, in which external enzymes such as proteases, nucleases, β-glucanase, esterases, and lipases are added; or combinations of such methods. This allows effective use to be made of the extract residue of yeast extract in the manufacture of common yeast extract, in the form of the yeast cell wall fractions in the present invention. To speed up or the like, the enzyme treatment, pretreatment for physically rupturing the cell walls with a high pressure homogenizer or the like may be carried out before the enzyme treatment of the yeast. When such a high pressure homogenizer is used, the material is preferably dispersed at a pressure of between 100 and 1,000 $kg/cm^2$, for example.

At the completion of the enzyme treatment, the yeast is treated to remove the soluble internal cell components, such as by centrifugation, to obtain yeast cell wall fractions in the form of cell residue. The yeast cell wall fractions thus obtained without any particular chemical treatment consist of a film that is relatively durable in physical and chemical terms, consisting of glucan, mannan, and chitin layers, and can thus be used as an excellent coating agent capable of encapsulating greater amounts of substances without compromising the function of protecting the substances to be wrapped. However, the yeast cell wall fractions can also be prepared with the incorporation of yeast washing treatments, adjustment of the pH, temperature, or pressure, and the like as needed.

(Acid-Treated Yeast Cell Wall Fractions)

The acid-treated yeast cell wall fractions can be prepared in the form of yeast cell residue by treating the yeast with an enzyme treatment to remove the soluble internal cell components, and treating the resulting yeast cell wall fractions with an acidic aqueous solution to then further remove the solubilized components. More specifically, the aforementioned yeast cell wall fractions can be treated with 0.01 to 2 N, and preferably 0.1 to 0.5 N, acid such as hydrochloric acid, sulfuric acid, or nitric acid, the resulting suspension can be centrifuged or the like to separate the supernatant and yeast cell residue, and the yeast cell residue can be harvested to prepare the acid-treated yeast cell wall fractions. The material is also preferably heated to around 80° C. during the acid treatment.

The resulting acid-treated yeast cell wall fractions consist of a film that is relatively durable in physical and chemical terms, consisting of glucan, mannan, and chitin layers, and can thus be used as an excellent enteric coating agent or the like that is capable of wrapping greater amounts of a substance without compromising the function of protecting the substance to be wrapped, and that also allows the time at which dissolution begins to be controlled by changing the concentration of the acidic water that is used.

(Oxygen-Barrier Property Enhancer)

The coating agent of the present invention comprises these yeast cell wall factions and acid-treated yeast cell wall fractions to which an oxygen-barrier property enhancer is added/blended. The oxygen-barrier property enhancer is not particularly limited as long as a film, being formed from the coating agent prepared by adding the oxygen-barrier property enhancer to the above-mentioned yeast cell wall factions and acid-treated yeast cell wall fractions, can attain an oxygen permeability coefficient ($cm^3 \cdot mm/m^2 \cdot atm \cdot 24$ hr) less than 0.1 even under the condition of relative humidity 60% (RH 60%), 23° C. However, the ones which comprise an edible substance are preferable, and specific examples include saccharides having short chains such as monosaccharides (e.g., glucose, mannose, etc.) and oligosaccharides (e.g., maltose, trehalose, fructose, arabinose, nigerooligosacharide, lactose, D-glucono-1,5-lactone, etc.), low-hygroscopic amino acids (e.g., arginine hydrochloride, etc.), inorganic salts which form multihydrates (e.g., ferrous sulfate, sodium dihydrogen phosphate, etc.) and low-hygroscopic sugar alcohols (e.g., Palatinit, vitamin C, etc.). Two or more kinds of these oxygen-barrier property enhancer can be used together. The amount of the oxygen-barrier property enhancer added can be appropriately selected in consideration of properties of a coating agent of the present invention, a film formed from the coating agent, and a packaging material formed from the film, in particular, within the range of amount wherein the oxygen permeability coefficient ($cm^3 \cdot mm/m^2 \cdot atm \cdot 24$ hr) less than 0.1 can be attained under high humidity (RH 60%, 23° C.). Further, the oxygen permeability coefficient can be controlled by appropriately selecting kinds of oxygen-barrier property enhancers, its concentration for use, etc.

(Coating Agent)

There is no limitation to the coating agent of the present invention as long as it is a coating agent wherein an oxygen-barrier property enhancer is added to yeast cell wall fractions consisting of cell residue obtained by removing the internal soluble cell components of enzyme-treated yeast, or a coating agent wherein an oxygen-barrier property enhancer is added to acid-treated yeast cell wall fractions consisting of cell residue obtained by removing the internal soluble cell components of enzyme-treated yeast, said residue being treated with an acidic aqueous solution to further remove the solubilized components, and which enables a film for an oxygen permeability test being formed by using the coating agent to attain an oxygen permeability coefficient ($cm^3 \cdot mm/m^2 \cdot atm \cdot 24$ hr) less than 0.1 under the condition of relative humidity 60%, 23° C. For example, such coating agent can be produced by adding the above-described oxygen-barrier property enhancer to aqueous suspension (2 to 20 wt %, preferably, 4 to 15 wt %) of the above-mentioned yeast cell wall fractions or acid-treated yeast cell wall fractions, such that the amount of the oxygen-barrier property enhancer makes 5 to 150 wt %, preferably 20 to 100 wt % of a solids concentration of the yeast cell wall fractions or acid-treated yeast cell wall fractions.

In addition, various additives can be appropriately blended into the coating agent of the present invention in consideration of properties of the coating agent of the present invention, a film formed from the coating agent, and a packaging material comprising the film, in particular, within the range of amount wherein the oxygen permeability coefficient ($cm^3 \cdot mm/m^2 \cdot atm \cdot 24$ hr) less than 0.1 can be attained under high humidity (RH 60%, 23° C.). The coating agents of the present invention have excellent properties allowing them to be used as bitterness masking agents or enteric coating agents which, compared to conventional edible coating agents, have a nonsticky finish despite their viscosity, resulting in coated particles and/or granules that do not stick together, and which are capable of controlling the time at which dissolution begins. Conventional coating agent solutions involve the use of quasi viscous fluids of dissolved polymers or dilatant fluid such as aqueous suspensions of starch, but the coating agents of the present invention are plastic fluids, and have different physical properties than conventional types.

(Coated Material)

The coated material of the present invention can be obtained by coating substances with the coating agent of the present invention. Any substance that is a solid at ordinary temperature can be used as the substance coated with the coating agent of the present invention. Examples include food products, food product materials, enzymes, microorganisms, pharmaceutical products, seeds, agrochemicals, fertilizer, fragrances, flavors, and savories, and pigments. Examples of the aforementioned food products and food product materials include starch food products, tableted food products, Western style confectionaries (candies, sweets, chocolate, chewing gum, etc.), Japanese style confectionaries (such as crackers), baked confectionaries (such as castella, cookies, and crackers), gummy candies, fried snacks (such as potato chips, snacks, and the like), various sauces, soy sauce, miso sauce, mayonnaise, or dressings in the form of powders or solids, various beverages (such as fruit juices, nectars, carbonated beverages, sports beverages, teas, coffee, cocoa, soups, and alcoholic beverages) in the form of powders or solids, various powder extracts (meats such as beef, pork, or chicken, seafood such as shrimps, scallops, corbicula, kelp and any marine products, vegetables and fruits, plants, yeast, etc.), oils and flavoring (vanilla, citrus, bonito, etc.) in the form of powders or solids, powder spices and herbs (red pepper, black pepper, Japanese sansho pepper, yuzu citron, basil, and the like), powdered beverages (such as instant coffee, instant tea, instant milk, instant soups and miso soups, etc.), various dairy products (such as cheese), various nutrient and nutritional supplement food materials (such as vitamins A, B, C, D, and E, edible microorganism of Bifidobacterium, Lactobacillus, Clostridium butyricum and other useful bacteria, chlorella, calcium and magnesium minerals, propolis, and the like), sprinkles, flakes, toppings (such as croutons), processed soy (such as tofu and bean curd dregs) in the form of solids, fresh and processed foods (such as curry and stews) in the form of solids and frozen foods (plain and coated), and various processed food products. The coating agents of the present invention are suitable for use when the substances to be wrapped are in granulated form, such as fine particles, granules, or tablets, or when the substance to be wrapped itself is in a form resembling granules, such as seeds.

(Coating Process)

The aforementioned substances to be wrapped can be coated with the coating agent of the present invention, by producing the aforementioned substances to be wrapped, either individually or in combination, in the form of granulated products having a suitable diameter, such as fine particles, granules, or tablets, and coating them with the coating agent of the present invention suspended in water or a mixture of water and solvent. Specifically, a coating device such as the Doria Coater (by Powrex Co., Ltd), for example, can be used to spray coat the substance to be wrapped with a suspension of the coating agent of the present invention, although any well-known coating method or device can be used. The drying temperature during the coating process, that is, the drying temperature after the substance to be wrapped has been coated with the suspension of the coating agent of the present invention, is not particularly limited, although it is preferable that the substance should ordinarily be dried at a temperature of between 60 and 90° C. The drying temperature can be set according to the temperature stability of the substance to be wrapped. Additionally, the drying time can be extended to obtain effects similar to the curing effects of latex-type coating agents used in pharmaceutical excipients. The amount of coating agent is determined properly according to the amount of the substance to be wrapped, that is used, the intended application, etc.

(Film)

The film of the present invention having extremely low oxygen permeability coefficient even under high humidity can be produced by forming a film, not coating substances to be wrapped, but using the coating agent of the present invention. The condition for forming the film is not particularly limited. For example, the film can be prepared by coating or dipping a plate with the use of the above-mentioned coating agent of the present invention with a thickness of 5 to 200 $g/m^2$, preferably 6 to 100 $g/m^2$, and then drying the plate at temperature between room temperature and 60° C.

In the present invention, "a film for an oxygen permeability test" means a film that is prepared as follows: the coating agent of the present invention, at an amount of 1 g in terms of a solids concentration of yeast cell wall fractions or acid-treated yeast cell wall fractions, is put in an 11 cm×11 cm square plastic plate, and dried at 40° C. for 24 hours, followed by storage under RH 50%, at 23° C. for 3 days. Further, in the present invention, "the oxygen permeability coefficient ($cm^3 \cdot mm/m^2 \cdot atm \cdot 24$ hr) of a film for an oxygen permeability test is less than 0.1 under the condition of relative humidity 60%" means that the oxygen permeability coefficient ($cm^3 \cdot mm/m^2 \cdot atm \cdot 24$ hr) is less than 0.1 in case where an oxygen permeability test is conducted according to JIS K 7126B with the use of a film for an oxygen permeability test under the measurement condition comprising a temperature of 23° C., relative humidity of 60%, a test surface area of 50 $cm^2$, and an oxygen concentration of 100%. An OX-TRAN 10/50 (MOCON: Modern Controls), for example, can be used for the above-mentioned oxygen permeability test.

(Packaging Material)

The packaging material of the present invention comprises the film mentioned above, and is an edible film which is safe even if it is eaten accidentally, besides the fact that it has extremely low gas permeability and water vapor permeability, for instance, it shows excellent oxygen-barrier property even under high humidity (RH 60%, temperature 23° C.), and further, it is biodegradable and environmentally-friendly. Therefore, the packaging material of the present invention is useful as a practical and versatile packaging film, and can be applied to a wide range of fields such as food products, pharmaceutical products, feed, and agriculture. In addition, as the packaged item of the present invention, any packaged item can be used as long as it is packaged with the packaging material of the present invention. Examples include packaged items of pharmaceutical preparations, enzymes, microorganisms, seeds, agrochemicals, fertilizers, fragrances, flavors, and savories, and pigments, in addition to those of the above-mentioned food products and food product materials.

The present invention is described in further detail below with reference to examples, but the technical scope of the present invention is not limited to these examples. The amounts of the yeast cells given in the examples are actual weight (dry weight).

EXAMPLE 1

Brewer's yeast slurry by-product was procured from a beer plant and was centrifuged for 10 minutes at 4500 rpm, and the resulting slushy live yeast was suspended in water to a solids concentration of 5 wt %. The suspension was allowed to undergo autolysis for 17 hours at 50° C., the product was centrifuged again to remove the soluble internal cell components, and the resulting autolysis residue was used as the yeast cell wall fraction. Then the yeast cell wall fraction was dispersed in water to a solids concentration of 10 wt %, and trehalose was dispersed as an oxygen-barrier property enhancer to 25 wt % of the yeast cell wall fraction solids concentration, so as to prepare a coating liquid.

As the substance to be wrapped, tablets consisting of 3.6 mg acetaminophen, 112.8 mg lactose, 3.0 mg HPC-L, and 0.6 mg magnesium stearate (total of 120 mg/tablet) were formed in advance, and these tablets were spray coated with the coating liquid using a Doria Coater (Powrex Co., Ltd) to a tablet:coating agent ratio of 80:20 (weight ratio), giving coated tablets in good condition showing no flaking or peeling on the coating.

EXAMPLE 2

Coated tablets were prepared in the same manner as in Example 1 except that torula yeast was used instead of the brewer's yeast used in Example 1, and coated tablets in good condition were obtained as in Example 1.

EXAMPLE 3

Yeast cell wall fractions obtained in the form of autolysis yeast residue in Example 1 were suspended in 0.5 N hydrochloric acid to a solids concentration of 5 wt %, treated with acid for 20 minutes at 80° C., and then centrifuged for 15 minutes at 4500 rpm to remove the solubilized components, and the resulting residue was used as the acid-treated yeast cell wall fraction. The acid-treated yeast cell wall fraction was then dispersed in water to a solids concentration of 7 wt %, and trehalose was dispersed as an oxygen-barrier property enhancer to 25 wt % of the acid-treated yeast cell wall fraction solids concentration, so as to prepare a coating liquid. The aforementioned tablets prepared in advance were then spray coated with the coating liquid using a Doria Coater (Powrex Co., Ltd) to a tablet:coating agent weight ratio of 80:20, giving coated tablets in good condition.

EXAMPLE 4

Oxygen Permeability Test

Yeast cell wall fractions obtained in the form of autolysis yeast residue in Example 1 were suspended in 0.5 N hydrochloric acid to a solids concentration of 5 wt %, treated with acid for 20 minutes at 80° C., and then centrifuged for 15 minutes at 4500 rpm to remove the solubilized components, and the acid-treated yeast cell wall fraction comprising the resulting residue was obtained. The yield of the acid-treated yeast cell wall fraction was 41.4%, and its solids concentration was 9.8 wt %. A film used for measurement in an oxygen permeation test was prepared as follows: various oxygen-barrier property enhancers were dispersed in water to 10, 25, 50, 100 wt % of the acid-treated yeast cell wall fraction solids concentration in a solution with the acid-treated yeast cell wall fraction solids concentration of 8.5 wt %, and the ingredients were homogenized to produce a liquid; the resulting liquid, at an amount of 1 g in terms of acid-treated solids, was put in an 11 cm×11 cm square plastic plate, and dried at 40° C. for 24 hours, followed by storage under RH 50%, at 23° C. for 3 days. An oxygen permeability test was conducted in accordance with JIS K 7126B. The test device was an OX-TRAN 10/50 by MOCON (Modern Controls). The conditions of measurement comprised a temperature of 23° C., relative humidity of 60%, a test surface area of 50 cm², and an oxygen concentration of 100%. The results are shown in Table 1. In addition, data obtained in the cases when HPMC, pulluran, and high-hygroscopic substances were added as a control are shown in Table 2. It can be seen from Table 1 that addition of an oxygen-barrier property enhancer to acid-treated yeast cell wall fractions brings about the coating agent of the present invention, that is, the coating agent which enables a film for an oxygen permeability test being formed by using the coating agent to attain an oxygen permeability coefficient ($cm^3 \cdot mm/m^2 \cdot atm \cdot 24$ hr) less than 0.1 under the condition of relative humidity 60%, 23° C.

TABLE 1

| No. | Samples | Oxygen permeability coefficient ($cm^3 \cdot mm/m^2 \cdot atm \cdot 24$ hr) |
|---|---|---|
| 1 | AYC:glucose = 4:1 | 0.073 |
| 2 | AYC:mannose = 4:1 | 0.090 |
| 3 | AYC:nigelooligosaccharide = 4:1 | 0.014 |
| 4 | AYC:nigelooligosaccharide = 2:1 | 0.030 |
| 5 | AYC:raffinose = 4:1 | 0.053 |
| 6 | AYC:arabinose = 4:1 | 0.065 |
| 7 | AYC:mannitol = 4:1 | 0.034 |
| 8 | AYC:maltose = 4:1 | 0.020 |
| 9 | AYC:fructose = 4:1 | 0.045 |
| 10 | AYC:lactose = 4:1 | 0.020 |
| 11 | AYC:D-glucono-1,5-lactone = 4:1 | 0.023 |
| 12 | AYC:arginine hydrochloride = 4:1 | 0.014 |
| 13 | AYC:trehalose = 4:1 | 0.030 |
| 14 | AYC:trehalose = 1:1 | 0.060 |
| 15 | AYC:Palatinit = 5:1 | 0.040 |
| 16 | AYC:L-ascorbic acid = 4:1 | 0.050 |
| 17 | AYC:ferrous sulfate = 4:1 | 0.001 |
| 18 | AYC:sodium dihydrogen phosphate = 2:1 | 0.020 |

TABLE 2

| No. | Samples | Oxygen permeability coefficient ($cm^3 \cdot mm/m^2 \cdot atm \cdot 24$ hr) |
|---|---|---|
| 1 | AYC:galactose = 4:1 | 2.710 |
| 2 | AYC:saccharose = 4:1 | 0.489 |
| 3 | AYC:glucose = 2:1 | 0.110 |
| 4 | AYC:xylose = 4:1 | 0.147 |
| 5 | AYC:lysine hydrochloride = 4:1 | 2.660 |
| 6 | AYC:L-proline = 4:1 | 0.180 |
| 7 | AYC:sodium chloride = 4:1 | 0.390 |
| 8 | AYC:potassium chloride = 4:1 | 0.270 |
| 9 | AYC:calcium gluconate hydrate = 4:1 | 0.110 |
| 10 | AYC:sorbitol = 2:1 | 0.500 |
| 11 | AYC:sorbitol = 4:1 | 0.560 |
| 12 | AYC:sorbitol = 5:1 | 0.160 |
| 13 | AYC:sodium alginate = 4:1 | 0.190 |
| 14 | HPMC | 18.500 |
| 15 | pullulan | 4.69 |
| 16 | AYC:glycerin = 10:1 | 0.300 |

INDUSTRIAL APPLICABILITY

The present invention makes it possible to provide a coating agent: which is readily dispersed in water, even without the use of emulsifiers or the like, and is applicable even in 100% water; which can also be used with a small amount of a solvent mixed therein; wherein the finish is not as sticky, despite its viscosity, as gums such as gum arabic, resins such as shellac, or zein or Eudragit or the like, and which results in the coated particles or granules that do not stick to each other; which is also highly safe, since it is not harmful when directly touched and is edible, and a coating agent also useful as an enteric coating agent having a function to control dissolution time according to the amount coated and the acid treatment conditions, coated materials coated with the coating agents, a film formed from the aforementioned coating agent and having an extremely low oxygen permeability coefficient even under highly humid conditions, a packaging material comprising the film, a packaged item packaged with the packaging material. In particular, the above-mentioned packaging material is an edible film which is safe even if it is eaten accidentally, besides the fact that it has extremely low gas permeability and water vapor permeability, for instance, it shows excellent oxygen-barrier property even under high humidity (RH 60%, temperature 23° C.), and further, it is biodegradable and environmentally-friendly. Therefore, the packaging material of the present invention is useful as a practical and versatile packaging film, and can be applied to a wide range of fields such as food products, pharmaceutical products, feed, and agriculture.

The invention claimed is:

1. A coating agent wherein an oxygen-barrier property enhancer is added to yeast cell wall fractions consisting of cell residue obtained by removing the internal soluble cell components of enzyme-treated yeast, and which forms a film for an oxygen permeability test with an oxygen permeability coefficient ($cm^3 \cdot mm/m^2 \cdot atm \cdot 24hr$) less than 0.1 under the condition of relative humidity 60% at 23° C.

2. A coating agent prepared by adding one or more oxygen-barrier property enhancers selected from the group consisting of glucose, mannose, maltose, trehalose, fructose, raffinose, arabinose, lactose, D-glucono-1,5-lactone, arginine hydrochloride, ferrous sulfate, sodium dihydrogen phosphate, mannitol, Palatinit, and vitamin C, to acid-treated yeast cell wall fractions consisting of cell residue obtained by removing the internal soluble cell components of autolysed yeast, or yeast treated with enzymes selected from the group consisting of proteases, nucleases, β-glucanase, esterases, lipases or combination of such methods, wherein said residue is treated with an acidic aqueous solution to further remove the solubilized components, and which produces a film formed by coating with the coating agent in an oxygen permeability test at 23° C. and relative humidity of 60% with an oxygen permeability coefficient of <0.1 $cm^3 \cdot mm/m^2 \cdot atm \cdot 24$ hr.

3. A coated material, on which a coating treatment has been conducted using the coating agent according to claim 1.

4. A film formed from the coating agent according to claim 1.

5. A packaging material comprising the film according to claim 4.

6. The coating agent according to claim 1, wherein the oxygen-barrier property enhancer comprises an edible substance.

7. The coating agent according to claim 6, wherein the edible oxygen barrier property enhancer is one or more compound selected from the group consisting of monosaccharides, oligosaccharides, low-hygroscopic amino acids, inorganic salts which form multihydrates, and low-hygroscopic sugar alcohols.

8. The coated material according to claim 3, wherein the coated material is a granular material selected from fine particles, granules, or tablets.

9. The coated material according to claim 3, wherein the coated material is food products, food product materials, pharmaceutical preparations, enzymes, microorganisms, seeds, agrochemicals, fertilizers, fragrances, flavors, and savories, or pigments.

10. A packaged item comprising food products, food product materials, pharmaceutical preparations, enzymes, microorganisms, seeds, agrochemicals, fertilizers, fragrances, flavors, and savories, or pigments being packaged with the packaging material according to claim 5.

11. The coating agent according to claim 7, wherein one or more compounds selected from the group consisting of glucose, mannose, maltose, trehalose, fructose, arabinose, nigerooligosaccharide, lactose, D-glucono- 1,5-lactone, arginine hydrochloride, ferrous sulfate, sodium dihydrogen phosphate, Palatinit, and vitamin C is used as the edible oxygen-barrier property enhancer.

* * * * *

UNITED STATES PATENT AND TRADEMARK OFFICE
CERTIFICATE OF CORRECTION

PATENT NO.        : 7,541,037 B2                                    Page 1 of 1
APPLICATION NO.   : 10/468796
DATED             : June 2, 2009
INVENTOR(S)       : Kasai et al.

It is certified that error appears in the above-identified patent and that said Letters Patent is hereby corrected as shown below:

On the cover page,

Item [*] Notice:    Subject to any disclaimer, the term of this patent is extended or adjusted under 35 USC 154(b) by 397 days.

Delete the phrase "by 397 days" and insert -- by 748 days --

Signed and Sealed this

Fifteenth Day of June, 2010

David J. Kappos
*Director of the United States Patent and Trademark Office*